(No Model.) 2 Sheets—Sheet 1.
C. GRÜBER.
APPARATUS FOR MANUFACTURING CHAIN LINKS AND RINGS.
No. 578,401. Patented Mar. 9, 1897.
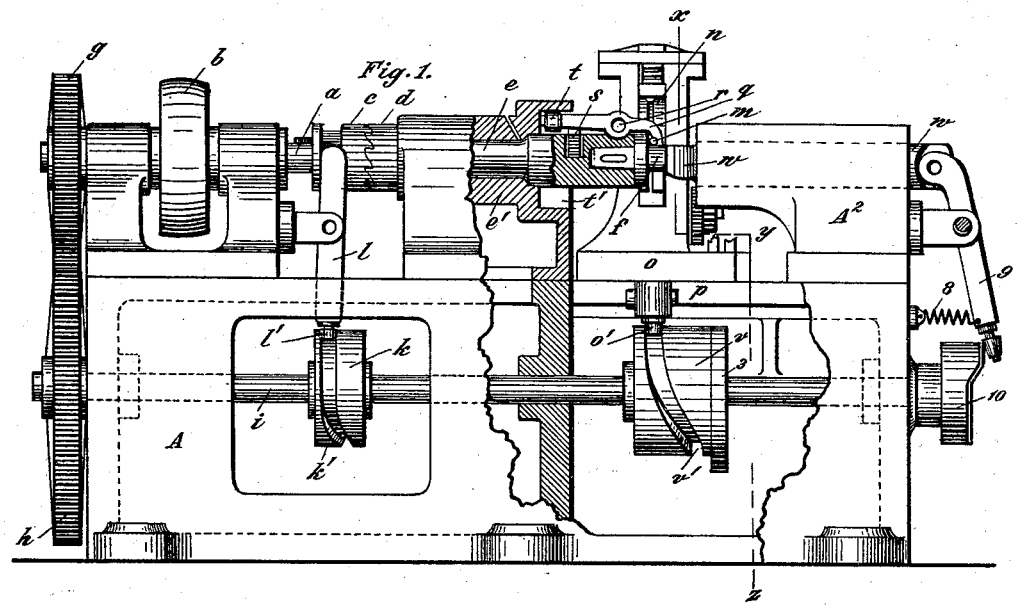
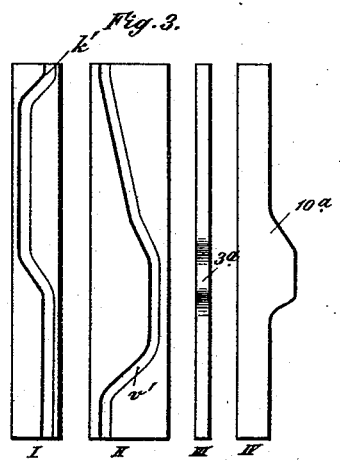
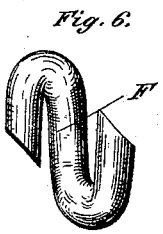

(No Model.) 2 Sheets—Sheet 2.
C. GRÜBER.
APPARATUS FOR MANUFACTURING CHAIN LINKS AND RINGS.
No. 578,401. Patented Mar. 9, 1897.
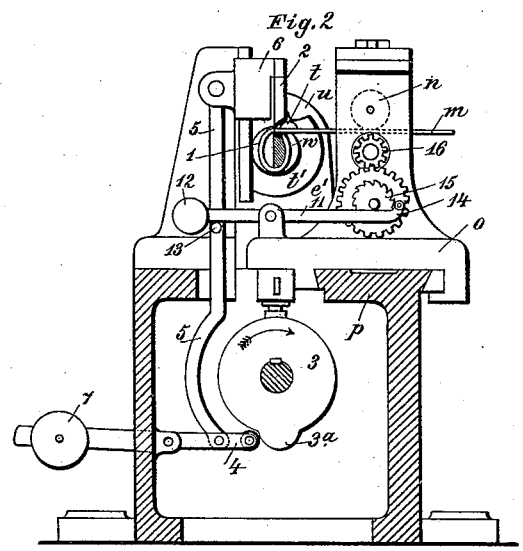
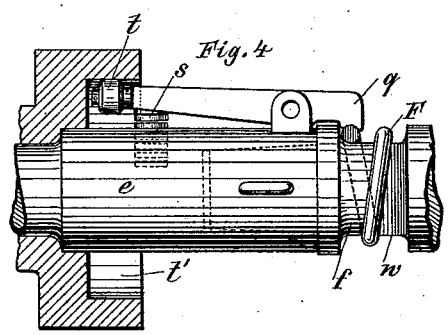
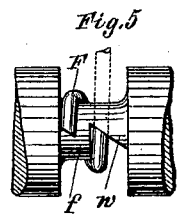
Witnesses
Florence E. Harpell
J. C. Bakewell
Inventor
Carl Grüber
by James C. Bakewell
his Attorney

UNITED STATES PATENT OFFICE.

CARL GRÜBER, OF SCHWERTE, GERMANY.

APPARATUS FOR MANUFACTURING CHAIN-LINKS AND RINGS.

SPECIFICATION forming part of Letters Patent No. 578,401, dated March 9, 1897.

Application filed June 6, 1895. Serial No. 551,879. (No model.) Patented in England April 30, 1895, No. 8,613.

*To all whom it may concern:*

Be it known that I, CARL GRÜBER, of Schwerte, Westphalia, in the Kingdom of Prussia, German Empire, have invented a new and useful Improvement in Apparatus for the Manufacture of Chain-Links and Rings, (for which I have obtained a patent in Great Britain, No. 8,613, dated April 30, 1895,) of which the following is a true and accurate description.

The object of my invention is to provide apparatus for the manufacture of chain-links and rings, by means of which apparatus the metal rod is first bent and cut, so that the blanks so formed may be hung one in another ready to be welded, which welding may be done by hand or any suitable means.

In the use of my improved apparatus the cold or previously-heated rod of round iron is passed between two feed-rolls, and with one end clamped to the forming-mandrel by a full revolution thereof and a lateral movement of the feed the iron is bent around the mandrel, so that the chain-link is open and a second link can be hung therein. A cutting-mandrel is then brought under the iron rod, and the link or blank that has been formed is cut therefrom and dropped from the mandrels, so that the formation of a second blank can be proceeded with in a like manner.

I will now describe my invention, so that others skilled in the art may manufacture and use the same, reference being had to the accompanying drawings, forming part of this specification, in which—

Figure 1 is a side elevation, partially in section. Fig. 2 is a vertical sectional view on the line $x\,y\,z$ of Fig. 1. Fig. 3 is a diagram showing the shape and relative operation of the cams. Fig. 4 is a detached view of the bending and cutting mandrels. Fig. 5 is a detached plan view of the mandrels. Fig. 6 is a view of the blank after it has been formed and cut from the rod.

Like letters and figures of reference indicate like parts wherever they occur.

On the frame A is journaled the main driving-shaft $a$, which is driven by the belt-wheel $b$. At the end of the shaft $a$ is the clutch $c$, arranged with a feather and spline to slide on the shaft and to engage with the other part $d$ of the clutch, which is fixed to the shaft $e$. At the other end of this shaft $e$ is the forming or bending mandrel $f$, which extends at right angles to the line of feed of the rod from which the link is formed.

On the main power-shaft $a$ is a gear-wheel $g$, which meshes with the gear-wheel $h$ on the shaft $i$. The relative sizes of these gear-wheels is such that the shaft $i$ shall make a half-revolution at every complete revolution of the shaft $a$. On the shaft $i$ is keyed a wheel or drum $k$, having a cam-groove $k'$, in which a pin or roller $l'$ of the lever $l$ engages. This lever $l$ is pivoted to a stationary bracket and at its other end engages with a groove in the sliding clutch $c$. The cam-groove $k'$ moves the pin $l'$ and the lever $l$ at every half-revolution of the shaft $i$ first to the left and then to the right, and consequently at every complete revolution of the shaft $a$ moves and holds the clutch $c$ in contact with the part $d$; also, with the next half-revolution of the shaft $i$ the pin $l'$ is pushed in the reverse direction and held thereby, separating the parts $c$ and $d$ of the clutch, so that the shaft $e$ and the mandrel $f$ remain stationary during an entire revolution of the shaft $a$.

The iron rod $m$ out of which the link is formed is held between two feed-rollers $n$, which are journaled in a sliding bracket $o$, which is movably supported on a way or table $p$ of the frame A. The end of the rod $m$ is held on the mandrel $f$ by a clamp $q$, which is pivoted in the bracket $r$ on the end of the shaft $e$, and by means of a spring $s$ the jaw of the clamp is pressed toward the mandrel $f$. At the end of the arm of the clamp $q$ is a roller $t$, which is situate within the cylindrical cam $t'$, which is formed in the end of the journal-casting $e'$. This cam is provided with a cam-boss $u$, (shown in Fig. 2,) against which the roller $t$ comes in contact during the revolution of the shaft $e$, and thereby the clamp is raised from the blank formed on the mandrel.

The chain-link must be bent on the mandrel spirally, as is shown in Fig. 4, so that the ends of the blank will stand out from each other to allow a welded link to be hung in the unfinished blank before it is welded. To this end the slide $o$, which carries the feed-rolls, is moved longitudinally on the table $p$ during the revolution of the mandrel $f$ by means of the cam-groove $v'$ in the cam $v$, which is keyed to the shaft $i$, in which groove fits a pin or roller $o'$, that extends from the slide $o$. This movement of the slide $o$ must be sufficient to carry the clamped end of the blank out of the line of movement of the cutter. After the blank has been formed on the mandrel $f$ it is cut from the rod $m$ by means of the cutter 2, which is secured to the sliding head 6, from which a lever-arm 5 extends to the lever 4. The lever 4 is depressed and the cutter is brought down on the rod $m$ by the cam 3, which is keyed to the shaft $i$, and the cutter is raised by the action of the counterweight 7. The cutter-mandrel $w$ is arranged to reciprocate in the bearing $A^2$, so as to support the rod $m$ under the cutter. A spring 8, which is connected with one arm of the lever 9, the other end of which lever is pivoted to the cutter-mandrel, is designed to draw the cutter-mandrel back quickly as soon as the blank is cut from the rod, so that the support is removed and the blank is free to fall down. This cutter-mandrel is caused to reciprocate by the cam $10^a$ on the collar 10 of the shaft $i$, which cam bears against a roller or pin on the end of the lever 9.

On the slide $o$ is a two-armed lever 11, (shown in Fig. 2,) which is provided at one end with a counterweight 12 and is supported by a pin 13, extending from the lever-arm 5. At the other end of the lever 11 is a pawl 14, which engages with the ratchet-wheel 15, which is secured to a gear-wheel, the teeth of which mesh with a pinion 16, which is keyed to the neck of the lower of the two feed-rollers $n$, so that, following the cutting of the rod $m$, when the cutter-head 6 is raised the weighted end of the lever 11 is also raised, depressing the pawl on the other end of the lever and giving the feed-rolls a sufficient revolution to feed the rod $m$ under the clamp $q$.

The operation of the apparatus is best explained by means of the diagram of the four cams shown in Fig. 3, in which I shows the curve and extent of the groove $k'$, II that of the cam-groove $v'$, III that of the cam 3, and IV the curve of the cam $10^a$. In this diagram these cams are arranged side by side in the relative positions occupied by them when the rod $m$ has been fed forward and has been grasped by the clamp $q$. The groove $k'$ now runs to the left and by means of the pin $l'$ and the lever $l$ the shafts $a$ and $e$ are coupled by the clutch $c$ $d$ until the shaft $e$ has made a complete revolution. During this operation the groove $v'$ runs from left to right, which imparts movement to the slide $o$ and carries the feed-rolls $n$, so that a spiral form is given to the blank as it is bent around the mandrel $f$. The groove $k'$ then runs from left to right, whereby the connection between the shafts $a$ and $e$ is broken. The groove $v'$ is then in a straight line, which allows the slide $o$ to remain stationary, while the cam $3^a$ on the cam-wheel 3 causes the cutter 2 to descend and cut the blank from the rod $m$. Just prior to this the cam $10^a$ presses on the lever 9 and brings the cutter-mandrel $w$ against the forming-mandrel $f$. The cam $10^a$ then runs sharply back, so that a quick retraction of the lever 9 and the mandrel $w$ follows, and the bent blank is thrown from the mandrel $f$. The cam-groove $v'$ also turns sharply to the left, whereby the slide $o$ is brought back to its first position, after which these various movements are repeated and other blanks are formed in a like manner.

For the manufacture of rings it is only necessary to substitute in place of the oval mandrel one of cylindrical shape of a corresponding diameter.

The links may be welded by hand or any suitable means.

The advantages of my invention will be apparent to those skilled in the art.

Having thus described my invention, what I claim, and desire to secure by Letters Patent, is—

1. In apparatus for the manufacture of chain-links and rings the combination of a forming-mandrel, mechanism for imparting intermittent motion to the mandrel, a feeding device mounted on a slide, and composed of means for advancing the rod, mechanism connecting the said slide with a power-shaft for imparting a longitudinal movement to the slide, a reciprocating cutter-mandrel, mechanism for imparting motion thereto, a clamp adjacent to the forming-mandrel and a cutter and mechanism for operating the same, substantially as and for the purpose specified.

2. In apparatus for the manufacture of chain-links and rings the combination of a forming-mandrel, a longitudinally-moving feeding device, composed of means for advancing the rod, a reciprocating cutter-mandrel, a cutter, and operating mechanism, substantially as and for the purpose specified.

3. In apparatus for the manufacture of chain-links and rings the combination of a forming-mandrel, a clamp adjacent thereto, a cutter, feed-rollers mounted on a movable slide, and a lever ratchet and pawl for operating the feed-rollers arranged to be operated by the cutter-lever, substantially as specified.

4. In apparatus for the manufacture of chain-links and rings, the combination with rod-feeding means, and a movable cutter, of two mandrels arranged in line with each other and provided with means for bringing their ends together to bend the link or ring and for separating them to discharge the bent blank; in combination with a clutch for connecting one of said mandrels with a power-shaft, the cam and connections for periodically engaging and disengaging said clutch, the cam for separating the mandrels periodically, and the means for periodically severing the rod and feeding it for a new link, substantially as described.

5. In apparatus for the manufacture of chain-links and rings, the combination with bending devices, composed of two separable mandrels arranged in line with each other, one of them being provided with a cutter, of feed-rolls for advancing the rod, a movable cutter arranged to coöperate with the cutter on the mandrel, the cutting edges being in the same plane as the axis of the bending-mandrel although preferably obliquely transverse to such axis, whereby the rod may be held by the feed-rolls until the blank has been fully bent; substantially as described.

In witness whereof I have hereunto set my hand in presence of two witnesses.

CARL GRÜBER.

Witnesses:
F. H. STRAUSS,
R. E. JAHN.